United States Patent
Ma et al.

(10) Patent No.: US 9,882,842 B2
(45) Date of Patent: Jan. 30, 2018

(54) MAIL PROCESSING METHODS AND SERVER

(71) Applicant: TENCENT TECHNOLOGY (SHENZHEN) COMPANY LIMITED, Shenzhen (CN)

(72) Inventors: Huateng Ma, Shenzhen (CN); Xiaolong Zhang, Shenzhen (CN); Tieming Huang, Shenzhen (CN); Jiahui Du, Shenzhen (CN); Jie Yang, Shenzhen (CN); Ziqun Huang, Shenzhen (CN); Wenjie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 381 days.

(21) Appl. No.: 14/643,551

(22) Filed: Mar. 10, 2015

(65) Prior Publication Data
US 2015/0188853 A1 Jul. 2, 2015

Related U.S. Application Data

(63) Continuation of application No. PCT/CN2013/082974, filed on Sep. 5, 2013.

(30) Foreign Application Priority Data

Sep. 10, 2012 (CN) .......................... 2012 1 0332204

(51) Int. Cl.
*G06F 15/16* (2006.01)
*H04L 12/58* (2006.01)

(52) U.S. Cl.
CPC ............ *H04L 51/02* (2013.01); *H04L 51/063* (2013.01); *H04L 51/08* (2013.01); *H04L 51/14* (2013.01)

(58) Field of Classification Search
CPC ..... H04L 12/583; H04L 51/063; H04L 51/08; H04L 51/14; H04L 51/02; G06F 15/16
See application file for complete search history.

(56) References Cited

U.S. PATENT DOCUMENTS

| | | | | |
|---|---|---|---|---|
| 2002/0112010 | A1* | 8/2002 | Soroker | H04L 51/063 709/206 |
| 2009/0094335 | A1* | 4/2009 | Edmonds | G06F 15/16 709/206 |
| 2009/0313348 | A1* | 12/2009 | Plestid | H04L 12/583 709/217 |

FOREIGN PATENT DOCUMENTS

| | | |
|---|---|---|
| CN | 1735077 A | 2/2006 |
| CN | 102651722 A | 8/2012 |
| EP | 2136515 A1 | 12/2009 |

OTHER PUBLICATIONS

EP Search Report dated Aug. 11, 2015 re: Application No. PCT/CN2013/082974; citing: EP 2 136 515 A1, US 2002/112010 A1 and US 2009/094335 A1.

(Continued)

*Primary Examiner* — Philip Chea
*Assistant Examiner* — Mohammed Ahmed
(74) *Attorney, Agent, or Firm* — Cantor Colburn LLP

(57) ABSTRACT

Mail processing methods and a server are described. The server receives a mail reply request sent from a client, determines whether a new contact and an original attachment are present in the mail reply request, and if it determines that the new contact and the original attachment are present in the mail reply request, generates a data packet based on a predetermined rule for non-regular mails, and transmits the data packet to a destination.

5 Claims, 4 Drawing Sheets

(56) References Cited

OTHER PUBLICATIONS

International Preliminary Report on Patentability and Written Opinion dated Mar. 19, 2015 re: Application No. PCT/CN2013/082974; citing: US 2009094335 A1.
International Search Report dated Dec. 12, 2013 re: Application No. PCT/CN2013/082974; citing: US2009094335 A1, CN 102651722 A andCN 1735077 A.
Written Opinion dated Dec. 12, 2013 re: Application No. PCT/CN2013/082974; pp. 1-8; citing: US 2009094335 A1.

* cited by examiner

MAIL PROCESSING METHODS AND SERVER

CROSS REFERENCE TO RELATED APPLICATIONS

The application is a continuation application of International Patent Application No. PCT/CN2013/082974, entitled "Mail Processing Method and System", filed on Sep. 5, 2013, which claims the benefit of Chinese Patent Application No. 201210332204.6, entitled "Mail Processing Method and System", filed on Sep. 10, 2012, both of which are incorporated herein in their entirety by reference.

TECHNICAL FIELD

The present disclosure relates to network communications, and especially to mail processing methods and a server.

BACKGROUND

E-mail is a way of communication using electronic means to exchange information. Receiving and sending mails by using the e-mail enables a user to contact with network users anywhere in the world rapidly. The format of the e-mail may be various forms such as text, image, sound, etc., and the e-mail may carry attachments, which facilitate people's life.

When a user receives an e-mail attached with an attachment, he may reply by two ways. One way is direct reply. Another way is reply with attachments, and the attachments may include a newly added attachment and an original attachment. However, when the user replies to the e-mail and adds a recipient, the following problems may arise in the two ways of reply:

(1) Direct reply will result in the newly added recipient being unable to receive the original attachment such that the communication between the newly added recipient and an existing recipient is blocked; and (2) Reply with the original attachment is inconvenient for the existing recipient, since the existing recipient does not need to receive the original attachment any more.

In summary, the traditional ways of replying to an e-mail cannot meet requirements of users and are inconvenient for users to use.

SUMMARY

The present disclosure provides mail processing methods and a server to meet requirements of user, and greatly facilitate use of users.

A mail processing method is provided according to the present disclosure, which includes:

a server receiving a mail reply request sent from a client, determining whether a new contact and an original attachment are present in the mail reply request, if it is determined that the new contact and the original attachment are present in the mail reply request, generating a data packet based on a predetermined rule for non-regular mails, and transmitting the data packet to a destination.

A server for processing mails is provided according to the present disclosure, including an interface and a processor, in which:

the processor is configured to receive a mail reply request from a client via the interface, determine whether a new contact and an original attachment are present in the mail reply request, and if it determines that the new contact and the original attachment are present in the mail reply request, generate a data packet based on a predetermined rule for non-regular packets, and transmit the data packet to a destination via the interface.

A mail processing method is provided according to the present disclosure, including:

a client sending a mail reply request to a server, so that the server generates a data packet based on a predetermined rule for non-regular mails and transmits the data packet to a destination when the server determines that a new contact and an original attachment are present in the mail reply server.

In the present disclosure, it is determined whether the new contact and the original attachment are present in the mail reply request, when it is determined that the new contact and the original attachment are present in the mail reply request, the data packet is generated based on the predetermined rule for non-regular mails, and is transmitted to the destination, so that when a mail is replied to, not only the new contact can receive the original attachment, which facilitates communications between the two parties; but also an existing contact would not be bothered by the original attachment, which greatly facilitates use of the users.

DETAILED DESCRIPTION

In the following, the technical solutions of the present disclosure will be further described in combination with attached drawings and detailed embodiments. It should be understood that the detailed embodiments described herein are only for illustration of the present disclosure and should not be construed as limitations to the present disclosure.

Figure 1:
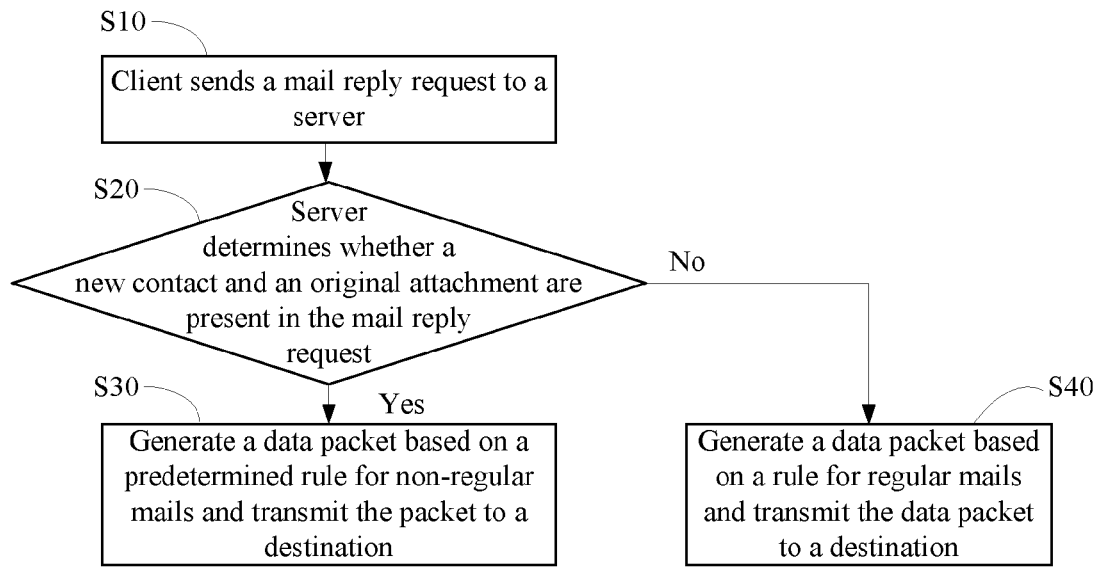
FIG. 1 is a schematic diagram illustrating a flow of a first mail processing method provided according to an embodiment of the present disclosure.

FIG. 1 is a schematic diagram illustrating a flow of a first mail processing method according to an embodiment of the present disclosure. The method may include the following blocks.

At block S10, a client sends a mail reply request to a server.

The client may be a mail client that is installed on a terminal such as a personal computer (PC), a personal digital assistant (PDA), a mobile phone (MP), etc., and it may be a webpage client (also referred to as webpage browser). The client is mainly configured to send/receive mails for a user, and show mail contents to the user. When the user replies to a mail, if a new contact and an original attachment are added, the client will mark the mail reply request, and send the marked mail reply request to the server.

At step S20, the server determines whether a new contact and an original attachment are present in the received mail reply request; and if yes, then block S30 is executed; or otherwise, block S40 is executed.

At block S30, the server generates a data packet based on a predetermined rule for non-regular mails and transmits the data packet to a destination.

At block S40, the server generates a data packet based on a rule for regular mails, and transmits the data packet to a destination.

The server determines whether a new contact and an original attachment are present in the mail reply request according to identification in the mail reply request, and if the new contact and the original attachment are present, the server generates a data packet based on the predetermined rule for non-regular mails, and transmits the data packet to a destination; and if at least one of a new contact and the original attachment is not present in the mail reply request, then the server generates a data packet based on the rule for regular mails, and transmits the generated data packet to a destination. The predetermined rule for non-regular mails is a rule to enable the original attachment only to be sent to the new contact.

In the present disclosure, when it is determined that both the new contact and the original attachment are present in the mail reply request, the data packet is generated based on the predetermined rule for non-regular mails, and is transmitted to the destination, so that when the mail is replied to, not only the new contact can receive the original attachment, which facilitates communications between the two parties; but also an existing contact would not be bothered by the original attachment, which greatly facilitates use of the users.

Further, the mail reply request may contain a mail, the existing contact, the new contact, a new attachment, the original attachment, and so on. The mail refers to contents like text, pictures, and so on in a mail of reply; the existing contact refers to a contact present in the original mail; the new contact refers to a contact that is newly added when the mail is replied to, including a newly added contact in blind carbon copy or carbon copy; the new attachment refers to an attachment newly added when the mail is replied to; and the original attachment is an attachment carried by the original mail. In the mail reply request, the existing contact is a basic item, and the mail, the new contact, the new attachment, and the original attachment are optional. That is, there must be a contact in the mail reply request, while the others are optional. Each item in the mail reply request is sent in a data block, and each data block is added with corresponding identification.

The server may include a mail transfer server and a mail delivery server. The mail transfer server is mainly configured to put a mail needs to be sent by the client into a mail queue according to a mail sending request sent by the client, and provide routing for the mail to be sent so that the mail to be sent can be transferred to the mail delivery server. The mail delivery server is mainly configured to deliver the mail transferred by the mail transfer server according to address information of its contacts. Of course, the server may include a mail storage server which is mainly configured to store correspondence mails and attachments in the mails on the server, and when the user looks up mails, the attachments only exist as address links. When the user views or downloads an attachment, he needs to obtain the attachment from the mail storage server.

Figure 2:
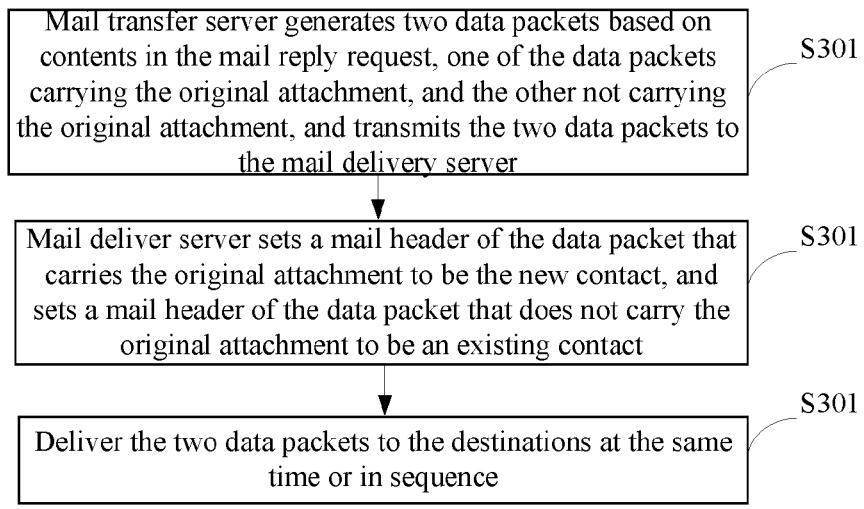
FIG. 2 is a schematic diagram illustrating a flow of a server generating a data packet based on a predetermined rule for non-regular mails and transmitting the data packet to a destination in the first mail processing method provided according to the embodiment of the present disclosure.

FIG. 2 is a schematic diagram of a flow of the server generating the data packet according to the predetermined rule for non-regular mails and transmitting the data packet to the destination in the first mail processing method according to the embodiment of the present disclosure. The block S30 specifically includes the following blocks.

At block S301, the mail transfer server generates two data packets based on contents in the mail reply request, one of the data packets carrying the original attachment, and the other not, and transmits the two data packets to the mail delivery server.

At block S302, the mail deliver server sets a mail header of the data packet that carries the original attachment to be the new contact, and sets a mail header of the data packet that does not carry the original attachment to be other contacts except for the new contact, i.e., the existing contact.

At block S303, the mail deliver server delivers the two data packets to destinations at the same time or in sequence.

As an example, the mail reply request contains a mail body, an existing contact, a new contact, a new attachment, and an original attachment. After the mail transfer server receives the mail reply request sent from the client, it generates two data packets according to contents in the mail reply request. One data packet contains the mail body and the new attachment, and the other data packet contains the mail body, the new attachment, and the original attachment. Then address information of the existing contact is added to a mail header of the data packet that does not carry the original attachment, and address information of the new contact is added to a mail header of the data packet that carries the original attachment. Finally, the two data packets are transferred to the mail delivery server. The mail delivery server may deliver the two data packets to the destinations at the same time, or may deliver the two data packets to the destinations in sequence. Thus, when a mail is replied, not only the new contact can receive the original attachment, which facilitates communications between the two parties; but also the existing contact would not be bothered by the original attachment, which greatly facilitates use of users.

Figure 3:
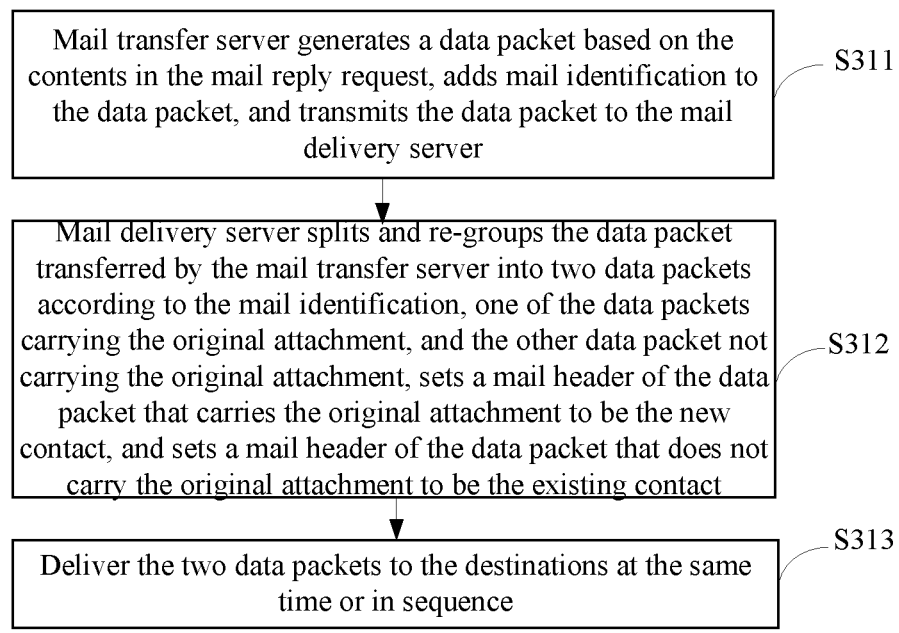
FIG. 3 is a schematic diagram illustrating another flow of a server generating a data packet based on a predetermined rule for non-regular mails and transmitting the data packet to a destination in the first mail processing method provided according to the embodiment of the present disclosure.

Since in the foregoing embodiment, the data packets transferred by the mail transfer server are two data packets generated based on the mail reply request, there may be a case where one data packet is lost or missed. Therefore, the present application provides a second mail processing method, which enables the server to generate a data packet according to the predetermined rule for non-regular mails, and transmit the data packet to a destination. Referring to FIG. 3, the block S30 includes the following process.

At block S311, the mail transfer server generates a data packet based on the contents in the mail reply request, adds mail identification to the data packet, and transmits the data packet to the mail delivery server.

At block S312, according to the mail identification, the mail delivery server splits and re-groups the data packet transferred by the mail transfer server into two data packets, one of the data packets carrying the original attachment, and the other data packet not carrying the original attachment, sets a mail header of the data packet that carries the original attachment to be the new contact, and sets a mail header of the data packet that does not carry the original attachment to be the other contacts except for the new contact, i.e., the existing contact.

At block S313, the mail delivery server delivers the two data packets to destinations at the same time or in sequence.

The mail identification is identification negotiated by the mail server according to mail standard protocols. The identification may point out to the mail delivery server that the data packet is a special data packet different from a regular data packet. The mail standard protocols refer to the simple mail transfer protocol (SMTP) and the post office protocol (POP3), etc. After the mail delivery server receives the data packet that carries the identification, it splits the data packet to form data blocks including a mail body, an existing contact, a new contact, a new attachment, an original attachment, etc., and according to a tag of each data block, re-groups the mail body and the new attachment into a data packet, re-groups the mail body, the new attachment, and the original attachment into another data packet, adds address information of the new contact in a mail header of the data packet that carries the original attachment, and adds address information of the existing contact in a mail header of the data packet that does not carry the original attachment. Finally, the mail delivery server delivers the generated two data packets to the destinations at the same time or in sequence. Therefore, when the mail is replied to, not only the new contact can receive the original attachment, which facilitates communications between the two parties; but also an existing contact would not be bothered by the original attachment, which greatly facilitates use of the users.

Further, in a third mail processing method provided according to an embodiment of the present disclosure, the server generates a data packet according to a predetermined rule, and transmits the data packet to destination. Specifically, the block S30 is as follows.

The server generates a data packet according to the mail reply request, adds mail identification to the data packet, and transmits the data packet to all contacts. With the mail identification, after a client of a contact receives the data packet added with the mail identification, if the contact is an existing contact, then the client blocks the original attachment; and if the contact is a new contact, then the client displays the original attachment.

The server is an intranet server. The intranet server determines whether a new contact and the original attachment are present according to the identification in the mail reply request, and if a new contact and the original attachment are present, generates a data packet according to the contents in the mail reply request, adds mail identification to the data packet, and transmits the data packet to all contacts. The mail identification is identification negotiated by the intranet server according to agreed protocols of it, and the identification may notify the client of the contact that the data packet is a special data packet different from a regular data packet. When a client of a contact receives the special data packet, if the contact is an existing contact, then blocks the original attachment; and if the contact is a new contact, then shows the original attachment. In this way, when the mail is replied to, not only the new contact can receive the original attachment, which facilitates communications between the two parties; but also an existing contact would not be bothered by the original attachment, which greatly facilitates use of the users.

Figure 4:
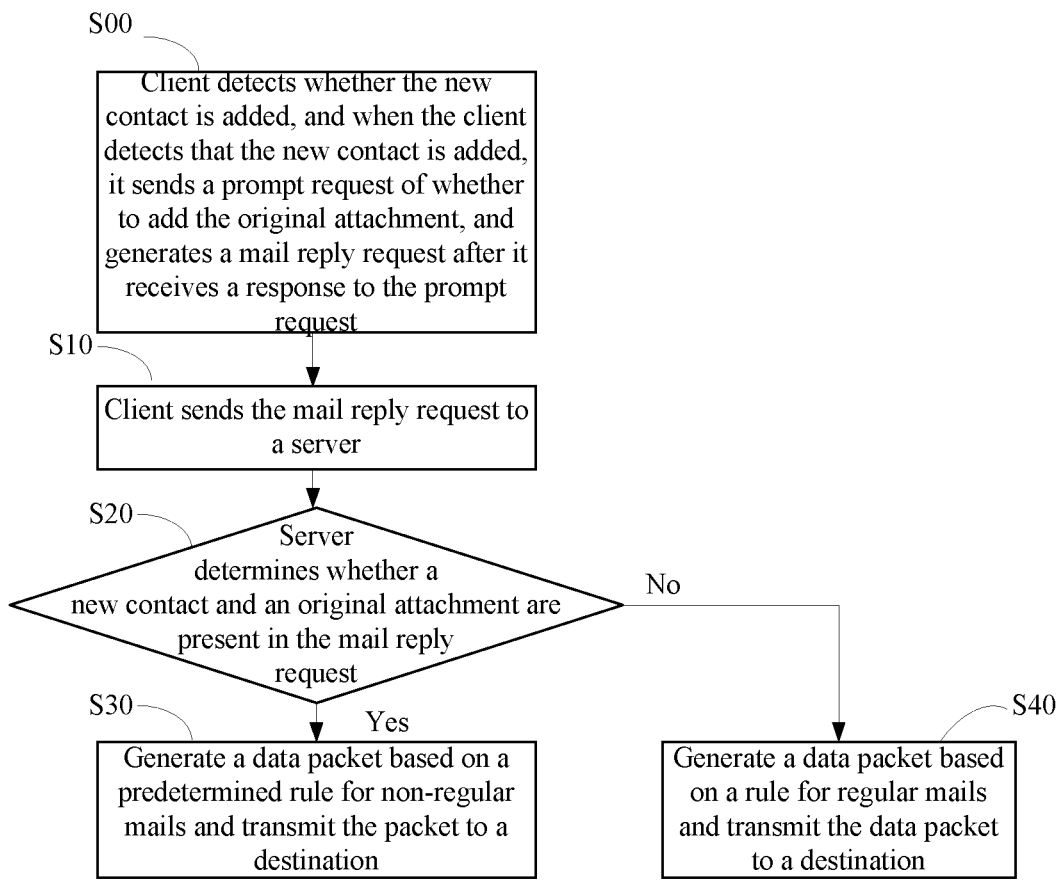
FIG. 4 is a schematic diagram illustrating a flow of another mail processing method provided according to an embodiment of the present disclosure.

FIG. 4 is another mail processing method according to an embodiment of the present application. In the mail processing method, prior to block S10, the following block is included.

At step S00, the client detects whether the new contact is added, and when the client detects that the new contact is added, it sends a prompt request of whether to add the original attachment, and generates the mail reply request after it receives a response to the prompt request.

When the client receives a reply instruction from the user, it enters into an edit page in a mail reply state. In this case, the client will detect whether a new contact is added, and once a new contact is added, it will send a prompt request of whether to add the original attachment. After the user adds the original attachment according to the prompt request, the client adds identification to the original attachment and generates the mail reply request. It is to be understood, that in the present embodiment, the client may detect whether a new contact is added after it receives a mail transmission instruction from the user, and if yes, then it sends the prompt request of whether to add the original attachment, and generates the mail reply request after it receives a response to the prompt request.

Figure 5:
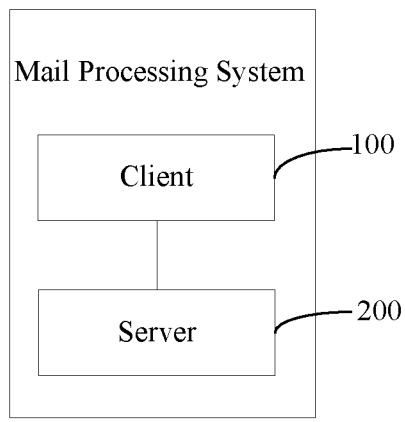
FIG. 5 is a schematic diagram illustrating a structure of a mail processing system according to an embodiment of the present disclosure.

FIG. 5 is a schematic diagram illustrating a structure of a mail processing system according to an embodiment of the present application. The mail processing system may include a client 100 and a server 200.

The client 100 is configured to send a mail reply request to the server 200.

The server 200 is configured to generate a data packet according to a predetermined rule for non-regular mails when a new contact and an original attachment are present in the mail reply request, and transmits the data packet to a destination.

The client 100 may be a mail client that is installed on a terminal such as a PC, a PDA, a MP, etc., and it may be a webpage client (also referred to as webpage browser). The client 100 is mainly configured to send and receive mails for a user, and shows mail contents to the user. When the user replies to a mail, if the new contact and the original attachment are added, the client 100 will mark the mail reply request and send the marked mail reply request to the server 200.

The server 200 determines whether the new contact and the original attachment are present in the mail reply request according to identification in the received mail reply request, and if the new contact and the original attachment are present in the mail reply request, then generates a data packet based on a predetermined rule for non-regular mails and transmits the data packet to a destination; and if at least one of the new contact and the original attachment is not present in the mail reply request, then generates a data packet based on a rule for regular mails, and transmits the data packet to a destination. The predetermined rule for non-regular mails is a rule to enable the original attachment only to be sent to the new contact.

In the present disclosure, when it is determined that the new contact and the original attachment are present in the mail reply request, the data packet is generated based on the predetermined rule for non-regular mails, and is transmitted to the destination, so that when the mail is replied to, not only the new contact can receive the original attachment, which facilitates communications between the two parties; but also an existing contact would not be bothered by the original attachment, which greatly facilitates use of the users.

Figure 6:
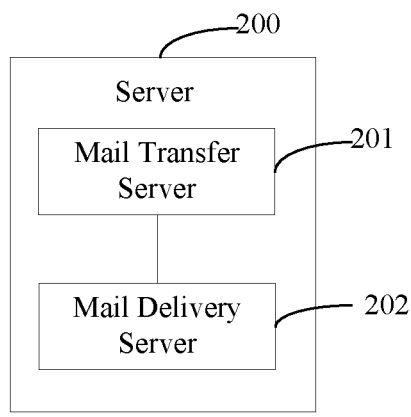
FIG. 6 is a schematic diagram illustrating a structure of a server in the mail processing system provided according to an embodiment of the present disclosure.

Further, FIG. 6 is a schematic diagram illustrating a structure of the server in the mail processing system according to an embodiment of the present application. Referring to FIG. 6, the server 200 includes a mail transfer server 201 and a mail delivery server 202, in which the mail transfer server 201 is configured to generate two data packets according to contents in the mail reply request. One of the data packets carries the original attachment, and the other does not. A mail header of the data packet that carries the original attachment is set to be the new contact, and a mail header of the data packet that does not carry the original attachment is set to be an existing contact. The data packets are transferred to the mail delivery server 202. The mail delivery server 202 is configured to deliver the two data packets to the destinations at the same time or in sequence.

In another embodiment, the mail transfer server 201 is configured to generate a data packet based on the contents in the mail reply request, add mail identification to the data packet, and transmit the data packet to the mail delivery server 202. The mail delivery server 202 is configured to split and re-group the data packet transferred by the mail transfer server 201 into two data packets according to the mail identification. One of the data packets carries the original attachment, the other does not. And the mail header of the data packet that carries the original attachment is set to be the new contact, and the data packet that does not carry the original attachment is set to be an existing contact. The two data packets are delivered to the destinations at the same time or in sequence.

In another embodiment, the server is an intranet server, and is configured to generate a data packet according to the mail reply request, add mail identification to the data packet, and transmit the data packet to all contacts. The mail identification is configured to, after the client of the contact receives the data packet that is added with the mail identification, block the original attachment if the contact is an existing contact; or show the original attachment if the contact is a new contact.

The mail identification is identification negotiated by the intranet server according to agreed protocols of it, and the identification may notify the client of the contact that the data packet is a special data packet different from a regular data packet. When a client of a contact receives the special data packet, if the contact is an existing contact, then blocks the original attachment; and if the contact is a new contact, then shows the original attachment. In this way, when the mail is replied to, not only the new contact can receive the original attachment, which facilitates communications between the two parties; but also an existing contact would not be bothered by the original attachment, which greatly facilitates use of the users.

Further, the client 100 is further configured to detect whether a new contact is added, and when it detects that a new contact is added, send a prompt request of whether to add the original attachment, and generate the mail reply request after it receives a response to the prompt request.

When the client 100 receives a reply instruction sent from the user, it enters into a mail reply state. In this case, the client 100 will detect whether a new contact is added, and once the client 100 detects that a new contact is added, it will send a prompt request of whether to add the original attachment. After the user adds the original attachment according to the prompt request, the client 100 will add identification to the original attachment, and generate the mail reply request. It is to be understood that, in the present embodiment, the client 100 may detect whether a new contact is added after it receives a mail transmission instruction from the user, and if yes, then it sends the prompt request of whether to add the original attachment, and generates the mail reply request after it receives a response to the prompt request.

A machine readable storage medium is provided according to an embodiment of the present application to store instructions that enable a machine to execute the mail processing methods described in the present disclosure. Specifically, a system or apparatus provided with a storage medium may be provided, software program codes to implement functions in any of the foregoing embodiments are stored on the storage medium, and a computer (or a CPU or a MPU) of the system or apparatus is enabled to read and execute the program codes stored on the storage medium.

In this circumstance, the program codes per se read from the storage medium can carry out the functions in any of the foregoing embodiments, and thus the program codes and the storage medium that stored the program codes constitute a part of the present application.

Embodiments of the storage medium which provides the program codes for example include a floppy disk, a hard disk, a magneto optical disk, an optical disk (e.g., CD-ROM, CD-R, CD-RW, DVD-RAM, CD-ROM, DVD-RW, or DVD+RW), a magnetic tape, a non-volatile storage and a ROM. Alternatively, the program codes may be downloaded from a server computer via a communication network.

Further, it is to be understood that by executing the program codes read out by the computer and by program code-based instructions enabling an operating system on the computer to carry out a part of or all of actual operations, the functions in any of the foregoing embodiments may be realized.

In addition, it can be understood that by writing the program codes read out from the storage medium into a memory configured in an extension board plugged in the computer, or writing into a memory configured in an extension unit connected with the computer, and then program code-based instructions enabling a CPU installed on the extension board or on the extension unit to execute a part of or all of the actual operations, the functions in any of the foregoing embodiments may be realized.

Figure 7:
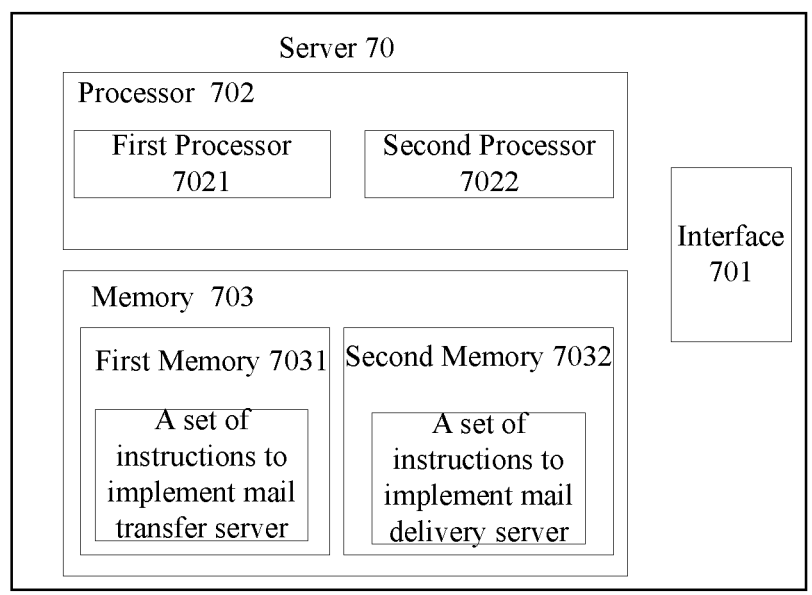
FIG. 7 is a schematic diagram illustrating a structure of a server in another mail processing system provided according to an embodiment of the present disclosure.

For example, FIG. 7 is a schematic diagram illustrating a structure of a server in another mail processing system provided according to another embodiment of the present disclosure. As shown in FIG. 7, the server 70 includes an interface 701 and a processor 702.

The processor 702 is configured to receive a mail reply request from a client via the interface 701, determine whether a new contact and an original attachment are present in the mail reply request, and if it determines that a new contact and an original attachment are present in the mail reply request, generate a data packet based on a predetermined rule for non-regular packets, and transmit the data packet to a destination via the interface.

In a first example, the processor 702 further includes a first processor 7021 and a second processor 7022. The server 70 further includes a first memory 7031 and a second memory 7032 which communicate with the first processor 7021 and the second processor 7022 respectively. On the first memory 7031, a first set of instructions are stored, and on the second memory 7032, a second set of instructions are stored. When the first set of instructions are executed by the first processor 7021, a mail transfer server is realized, and when the second set of instructions are executed by the second processor 7022, a mail delivery server is realized.

The mail transfer server is configured to generate two data packets based on contents in the mail reply request, one of the data packets carrying the original attachment, and the other not, and transmit the two data packets to the mail delivery server.

The mail deliver server is configured to set a mail header of the data packet that carries the original attachment to be a new contact, set a mail header of the data packet that does not carry the original attachment to be an existing contact, and send the two data packets to destinations at the same time or in sequence.

In a second example, the processor 702 further includes the first processor 7021 and the second processor 7022. The server 70 further includes the first memory 7031 and the second memory 7032 which communicate with the first processor 7021 and the second processor 7022 respectively. On the first memory 7031, the first set of instructions are stored, and on the second memory 7032, the second set of instructions are stored. When the first set of instructions are executed by the first processor 7021, the mail transfer server is realized, and when the second set of instructions are executed by the second processor 7022, the mail delivery server is realized.

The mail transfer server is configured to generate a data packet based on the contents in the mail reply request, add mail identification to the data packet, and transmit the data packet to the mail delivery server.

The mail delivery server splits and re-groups the data packet transferred by the mail transfer server into two data packets according to the mail identification, one of the data packets carrying the original attachment, and the other data packet not carrying the original attachment; and sets a mail header of the data packet that carries the original attachment to be the new contact, sets a mail header of the data packet that does not carry the original attachment to be the existing contact, and delivers the two data packets to destinations at the same time or in sequence.

In the first and second examples, the first memory 7031 and the first processor 7021 are located in a same physical device, and the second memory 7032 and the second processor 7022 are located in a same physical device. The first memory 7031 and the second memory 7032 may be located in a same physical device or in different physical devices. That is, the mail transfer server and the mail delivery server may be a physical server or may be two different physical servers (not shown).

In a third example, when the server is an intranet server, the processor 702 is configured to generate a data packet based on the mail reply request, add mail identification to the data packet, and transmit it to all contacts. When a client of a contact receives the data packet added with the mail identification, if the contact is an existing contact, blocks the original attachment; and if the contact is a new contact, then shows the original attachment.

With the foregoing technical solutions of the present disclosure, when a mail is replied to, not only the new contact can receive the original attachment, which facilitates communications between the two parties; but also an existing contact would not be bothered by the original attachment, which greatly facilitates use of the users.

What is claimed is:

1. A mail processing method, comprising:
a server receiving a mail reply request sent from a client, determining whether a new contact and an original attachment are present in the mail reply request,
if it is determined that the new contact and the original attachment are present in the mail reply request, generating a data packet based on a predetermined rule for non-regular mails, and transmitting the data packet to a destination;
wherein the server comprises a mail transfer server and a mail deliver server, and the server generating the data packet based on the predetermined rule for non-regular mails and transmitting the data packet to the destination comprises:
the mail transfer server generating two data packets based on contents in the mail reply request, wherein one of the data packets carries the original attachment, and the other data packet does not carry the original attachment, and transmitting the two data packets to the mail deliver server; and
the mail deliver server setting a mail header of the data packet that carries the original attachment to be the new contact, setting a mail header of the data packet that does not carry the original attachment to be an existing contact, and delivering the two data packets to the destination at the same time or in sequence; or
the mail transfer server generating a data packet based on contents in the mail reply request, adding mail identification to the data packet, and transmitting the data packet to the mail delivery server; and
the mail delivery server splitting and re-grouping the data packet transferred by the mail transfer server into two data packets according to the mail identification, one of the data packets carrying the original attachment, and the other data packet not carrying the original attachment; and setting a mail header of the data packet that carries the original attachment to be the new contact, setting a mail header of the data packet that does not carry the original attachment to be an existing contact, and delivering the two data packets to the destination at the same time or in sequence; or
the server is an intranet server, and the server generating the data packet based on the predetermined rule for non-regular mails and transmitting the data packet to the destination comprises:
the intranet server generating a data packet according to the mail reply request, adding mail identification to the data packet, and transmitting the data packet to all contacts; wherein the mail identification is configured to, after a client of a contact receives the data packet added with the mail identification, enable the client to block the original attachment in response to the contact being an existing contact; or show the original attachment in response to the contact being the new contact.

2. A server for processing mails, comprising an interface and a processor, wherein:
the processor is configured to receive a mail reply request from a client via the interface, determine whether a new contact and an original attachment are present in the mail reply request, and if it determines that the new contact and the original attachment are present in the mail reply request, generate a data packet based on a predetermined rule for non-regular packets, and transmit the data packet to a destination via the interface;
wherein the processor further comprises a first processor and a second processor, the server further comprises a first memory and a second memory which communicate with the first processor and the second processor respectively, a first set of instructions are stored on the first memory, a second set of instructions are stored on the second memory, when the first set of instructions are executed by the first processor, a mail transfer server is realized, and when the second set of instructions are executed by the second processor, a mail delivery server is realized;
the mail transfer server is configured to generate two data packets based on contents in the mail reply request, one of the data packets carrying the original attachment, and the other not carrying the original attachment, and transmit the two data packets to the mail delivery server; and the mail deliver server is configured to set a mail header of the data packet that carries the original attachment to be a new contact, set a mail header of the data packet that does not carry the original attachment to be an existing contact, and send the two data packets to the destination at the same time or in sequence; or the mail transfer server is configured to generate a data packet based on contents in the mail reply request, add mail identification to the data packet, and transmit the data packet to the mail delivery server; and the mail delivery server splits and re-groups the data packet transferred by the mail transfer server into two data packets according to the mail identification, one of the data packets carrying the original attachment, and the other data packet not carrying the original attachment; and sets a mail header of the data packet that carries the original attachment to be the new contact, sets a mail header of the data packet that does not carry the original attachment to be an existing contact, and delivers the two data packets to the destinations at the same time or in sequence; or the server is an intranet server, the processor is configured to generate a data packet based on the mail reply request, add mail identification to the data packet, and transmit the data packet to all contacts; wherein the mail identification is configured to, after a client of a contact receives the data packet added with the mail identification, enable the client to block the original attachment in response to the contact being an existing contact; or show the original attachment in response to the contact being the new contact.

3. The server according to claim 2, wherein the first memory and the first processor are located in a same physical device, the second memory and the second processor are located in a same physical device, and the first memory and the second memory are located in different physical devices.

4. A mail processing method, comprising:

a client sending a mail reply request to a server, so that the server generates a data packet based on a predetermined rule for non-regular mails and transmits the data packet to a destination in response to the server determining that a new contact and an original attachment are present in the mail reply request;

wherein the server comprises a mail transfer server and a mail deliver server, and the server generating the data packet based on the predetermined rule for non-regular mails and transmitting the data packet to the destination comprises:

the mail transfer server generating two data packets based on contents in the mail reply request, wherein one of the data packets carries the original attachment, and the other data packet does not carry the original attachment, and transmitting the two data packets to the mail deliver server; and the mail deliver server setting a mail header of the data packet that carries the original attachment to be the new contact, setting a mail header of the data packet that does not carry the original attachment to be an existing contact, and delivering the two data packets to the destination at the same time or in sequence; or the mail transfer server generating a data packet based on contents in the mail reply request, adding mail identification to the data packet, and transmitting the data packet to the mail delivery server; and the mail delivery server splitting and re-grouping the data packet transferred by the mail transfer server into two data packets according to the mail identification, one of the data packets carrying the original attachment, and the other data packet not carrying the original attachment; and setting a mail header of the data packet that carries the original attachment to be the new contact, setting a mail header of the data packet that does not carry the original attachment to be an existing contact, and delivering the two data packets to the destination at the same time or in sequence; or the server is an intranet server, and the server generating the data packet based on the predetermined rule for non-regular mails and transmitting the data packet to the destination comprises:

the intranet server generating a data packet according to the mail reply request, adding mail identification to the data packet, and transmitting the data packet to all contacts; wherein the mail identification is configured to, after a client of a contact receives the data packet added with the mail identification, enable the client to block the original attachment in response to the contact being an existing contact; or show the original attachment in response to the contact being the new contact.

5. The mail processing method according to claim 4, wherein prior to the client sending the mail reply request to the server, the method further comprises:

the client detecting whether the new contact is added, sending a prompt request of whether to add the original attachment when detecting that the new contact is added, and generating the mail reply request after receiving a response to the prompt request.

* * * * *